United States Patent
Fu et al.

(10) Patent No.: US 11,196,728 B1
(45) Date of Patent: Dec. 7, 2021

(54) CACHING LOGIN SESSIONS TO ACCESS A SOFTWARE TESTING ENVIRONMENT

(71) Applicant: FMR LLC, Boston, MA (US)

(72) Inventors: Li Fu, Liaoning (CN); Kevin Handy, Bow, NH (US); Nayan Patel, Needham, MA (US)

(73) Assignee: FMR LLC, Boston, MA (US)

( * ) Notice: Subject to any disclaimer, the term of this patent is extended or adjusted under 35 U.S.C. 154(b) by 0 days.

(21) Appl. No.: 17/216,544

(22) Filed: Mar. 29, 2021

(51) Int. Cl.
*G06F 11/36* (2006.01)
*G06F 9/44* (2018.01)
(Continued)

(52) U.S. Cl.
CPC ........ *H04L 63/061* (2013.01); *G06F 11/3664* (2013.01); *G06F 11/3688* (2013.01); *H04L 67/146* (2013.01); *G06F 11/368* (2013.01); *G06F 11/3684* (2013.01); *G06F 11/3692* (2013.01); *H04L 63/029* (2013.01);
(Continued)

(58) Field of Classification Search
CPC ... H04L 63/061; H04L 63/083; H04L 63/168; H04L 63/0407; H04L 63/029; H04L 63/0815; H04L 67/146; H04L 67/02; H04L 67/14; H04L 67/142; H04L 67/2842; H04L 67/1097; H04L 67/141; H04L 9/0891; H04L 9/0833; H04L 9/321; H04L 63/0428; G06F 11/3664; G06F 11/3688; G06F 11/368; G06F 8/10; G06F 8/20; G06F 11/3692; G06F 11/3684
See application file for complete search history.

(56) References Cited

U.S. PATENT DOCUMENTS

| 5,864,665 | A | * | 1/1999 | Tran | ........................ | G06F 21/33 |
| | | | | | | 726/10 |
| 6,041,357 | A | * | 3/2000 | Kunzelman | ......... | H04L 63/0815 |
| | | | | | | 709/228 |

(Continued)

OTHER PUBLICATIONS

Giuseppe Antonio Di Lucca et al., Testing Web Applications , 2002 IEEE, [Retrieved on Sep. 10, 2021]. Retrieved from the internet: <URL: https://ieeexplore.ieee.org/stamp/stamp.jsp?tp=&arnumber=1167787> 10 Pages (310-319) (Year: 2002).*

(Continued)

*Primary Examiner* — Anibal Rivera
(74) *Attorney, Agent, or Firm* — Proskauer Rose LLP (57) ABSTRACT

Methods and apparatuses are described for caching login sessions to access a software testing environment. A server identifies a test case for execution against an application in the software testing environment, the test case comprising one or more test steps. The server retrieves test data based upon the identified test case and generates a session key using the test data. The server requests an active session from a login session cache using the session key. When an active session exists in the login session cache, the server receives, from the login session cache, session data corresponding to the active session, establishes a connection to the application in the software testing environment using the session data and without first authenticating to the software testing environment, and executes one or more test steps of the test case against the application in the software testing environment using the test data.

20 Claims, 6 Drawing Sheets

(51) Int. Cl.
*H04L 29/06* (2006.01)
*H04L 29/08* (2006.01)

(52) U.S. Cl.
CPC .......... *H04L 63/083* (2013.01); *H04L 63/168* (2013.01); *H04L 67/02* (2013.01); *H04L 67/14* (2013.01)

(56) References Cited

U.S. PATENT DOCUMENTS

| | | | |
|---|---|---|---|
| 6,374,359 B1* | 4/2002 | Shrader | H04L 29/06 709/229 |
| 6,480,894 B1 | 11/2002 | Courts et al. | |
| 6,678,791 B1* | 1/2004 | Jacobs | G06F 16/9574 711/118 |
| 6,862,689 B2 | 3/2005 | Bergsten et al. | |
| 7,194,473 B1* | 3/2007 | Hichwa | H04L 67/02 |
| 7,444,410 B1* | 10/2008 | Hichwa | G06F 16/951 709/228 |
| 7,467,402 B2 | 12/2008 | Pennington et al. | |
| 7,792,975 B1* | 9/2010 | Dashora | H04L 67/14 709/228 |
| 7,853,782 B1* | 12/2010 | Geddes | H04L 63/029 713/151 |
| 7,979,909 B2* | 7/2011 | Jancula | H04L 63/0428 726/26 |
| 8,229,969 B1* | 7/2012 | Floyd | G06F 16/957 707/802 |
| 8,898,272 B1* | 11/2014 | Young | H04L 63/0407 709/223 |
| 9,064,124 B1* | 6/2015 | Davis | H04L 63/168 |
| 9,166,862 B1* | 10/2015 | Davis | H04L 67/1097 |
| 9,390,052 B1* | 7/2016 | Parakh | H04L 67/2842 |
| 9,621,399 B1* | 4/2017 | Parakh | H04L 29/06047 |
| 9,787,521 B1* | 10/2017 | Boynes | G06Q 30/06 |
| 9,866,640 B2* | 1/2018 | Motukuru | H04L 67/02 |
| 9,898,393 B2* | 2/2018 | Moorthi | G06F 11/368 |
| 10,270,753 B2 | 4/2019 | Khylkouskaya et al. | |
| 10,642,738 B1* | 5/2020 | Parakh | G06F 12/0868 |
| 10,997,320 B1* | 5/2021 | Aggrawal | H04L 9/0816 |
| 2002/0143958 A1 | 10/2002 | Montero et al. | |
| 2004/0054905 A1* | 3/2004 | Reader | H04W 12/06 713/171 |
| 2004/0216139 A1* | 10/2004 | Rhoda | H04L 41/0266 719/320 |
| 2006/0059125 A1* | 3/2006 | Yan | H04L 67/02 |
| 2006/0155857 A1* | 7/2006 | Feenan, Jr. | G06F 16/9574 709/227 |
| 2006/0230265 A1 | 10/2006 | Krishna | |
| 2007/0180233 A1* | 8/2007 | Matsushita | H04L 9/0833 713/159 |
| 2008/0040484 A1* | 2/2008 | Yardley | H04L 67/142 709/227 |
| 2008/0165958 A1* | 7/2008 | Matsushita | H04L 9/0891 380/44 |
| 2009/0293018 A1* | 11/2009 | Wilson | G06F 16/957 715/811 |
| 2011/0088011 A1* | 4/2011 | Ouali | G06F 8/10 717/105 |
| 2012/0096068 A1* | 4/2012 | Canning | H04L 67/02 709/203 |
| 2013/0152047 A1* | 6/2013 | Moorthi | G06F 11/368 717/124 |
| 2014/0088983 A1* | 3/2014 | Neff | G16H 40/67 705/2 |
| 2014/0304499 A1* | 10/2014 | Gopinath | H04L 63/168 713/151 |
| 2015/0121503 A1* | 4/2015 | Xiong | G06F 21/41 726/8 |
| 2015/0381621 A1* | 12/2015 | Innes | H04L 9/321 726/7 |
| 2016/0277383 A1* | 9/2016 | Guyomarc'h | H04L 63/083 |
| 2016/0277388 A1* | 9/2016 | Lowe | H04L 63/083 |
| 2016/0335454 A1* | 11/2016 | Choe | G06Q 30/018 |
| 2018/0159940 A1* | 6/2018 | Hultkrantz | H04L 67/141 |
| 2018/0288057 A1* | 10/2018 | Varadamma | G06F 21/6218 |
| 2020/0382488 A1* | 12/2020 | Liu | H04L 67/146 |
| 2021/0133089 A1* | 5/2021 | Khillar | G06F 16/9024 |

OTHER PUBLICATIONS

Sreedevi Sampath et al., Applying Concept Analysis to User-Session Based Testing of Web Applications, Sep. 17, 2007, [Retrieved on Sep. 10, 2021]. Retrieved from the internet: <URL: https://ieeexplore.ieee.org/abstract/document/4302777> 16 Pages (643-658) (Year: 2007).*

* cited by examiner

```
*** Settings ***
Documentation     A resource file with reusable keywords and variables.
Library           Selenium2Library

*** Variables ***
${BROWSER}        Firefox    502
${DELAY}          0

*** Keywords ***
Prepare
    Open Browser               https://wwwqa1.xyz.com    ${BROWSER}
    Maximize Browser Window
    Set Selenium Speed         ${DELAY}

Begin Session
    [Arguments]    ${ENVIRONMENT}    ${SSN}
    Go To    https://sessionapi.xyz.com:3443/ftgw/api/session/${ENVIRONMENT}/${SSN}

Go To Account Selector
    [Arguments]    ${ENVIRONMENT}    ${ACCOUNT}
    Go To    https://nnn${ENVIRONMENT}.xyz.com/ftgw/fbc/ofsummary/snippet/summary
    Location Should Be https://nnn${ENVIRONMENT}.xyz.com/ftgw/fbc/ofsummary/snippet/summary
```

CACHING LOGIN SESSIONS TO ACCESS A SOFTWARE TESTING ENVIRONMENT

TECHNICAL FIELD

This application relates generally to methods and apparatuses, including computer program products, for caching login sessions to access a software testing environment.

BACKGROUND

Automated testing and analysis of complex computer software source code using automation scripts is crucial to understanding the functional impact of source code changes across a wide variety of systems in a timely and efficient manner. Typically, automation testing tools (e.g., Sahi™, Selenium™) automatically execute test scripts against software in development to identify errors, bugs, and other defects with the software before it is deployed to a production computing environment. Typically, automation scripts must also automate the login process that a user would undertake when first accessing the application by executing an initialization and authentication routine for a particular test user as part of each software test run. Generally, repeated execution of such authentication routines in a software testing process is time consuming and contributes to significant delays in testing completion and efficiency. Also, existing architectures are exposed to adjacent dependencies (not directly relevant to the path being tested), each of which can cause delay, inefficiencies or instability.

SUMMARY

Therefore, what is needed are methods and systems that provide a mechanism for caching login sessions for test users when accessing a software testing environment, in order to eliminate the requirement for establishing a new login session with the testing environment each time a particular element of software functionality is tested. The techniques described herein advantageously provide for a login session cache that is accessed by a test suite during execution of test scripts and test cases, where the login session cache receives a session key from the test suite and provides active session data (such as HTTP cookies) to the test suite, so that the test suite can access the software functionality to be tested without necessitating the generation of new session data and cookies each time a test is run. In addition, the methods and systems beneficially keep the session active in the background, on behalf of the test suite whereas a normal web session requires regular user interaction to keep the session alive. The present system simulates this user interaction to maximize the benefits of the session caching it provides.

The invention, in one aspect, features a system for caching login sessions to access a software testing environment. The system includes a server computing device having a memory for storing computer-executable instructions and a processor that executes the computer-executable instructions. The server computing device identifies a test case for execution against an application in the software testing environment, the test case comprising one or more test steps. The server computing device retrieves test data based upon the identified test case. The server computing device generates a session key using the test data. The server computing device requests an active session from a login session cache using the session key. When an active session exists in the login session cache, the server computing device receives, from the login session cache, session data corresponding to the active session. The server computing device establishes a connection to the application in the software testing environment using the session data and without first authenticating to the software testing environment. The server computing device executes one or more test steps of the test case against the application in the software testing environment using the test data.

The invention, in another aspect, features a computerized method of caching login sessions to access a software testing environment. A server computing device identifies a test case for execution against an application in the software testing environment, the test case comprising one or more test steps. The server computing device retrieves test data based upon the identified test case. The server computing device generates a session key using the test data. The server computing device requests an active session from a login session cache using the session key. When an active session exists in the login session cache, the server computing device receives, from the login session cache, session data corresponding to the active session. The server computing device establishes a connection to the application in the software testing environment using the session data and without first authenticating to the software testing environment. The server computing device executes one or more test steps of the test case against the application in the software testing environment using the test data.

The invention, in another aspect, features a computerized method of caching login sessions to access a software testing environment. A server computing device identifies a test case for execution against an application in the software testing environment. The server computing device generates a session key using test data associated with the identified test case. The server computing device requests an active session from a login session cache using the session key. The server computing device receives, from the login session cache, session data corresponding to the active session. The server computing device establishes a connection to the application in the software testing environment using the session data and without first authenticating to the software testing environment. The server computing device executes the test case against the application in the software testing environment using the test data.

Any of the above aspects can include one or more of the following features. In some embodiments, when an active session does not exist in the login session cache, the server computing device requests, from an authentication system, a new session using authentication credentials; receives, from the authentication system, new session data corresponding to the new session; transmits the new session data to the login session cache; establishes a connection to the application in the software testing environment using the new session data; and executes one or more test steps of the test case against the application in the software testing environment using the test data.

In some embodiments, the session key comprises a user identifier and a test environment identifier. In some embodiments, requesting an active session from the login session cache using the session key comprises: identifying a network address associated with the login session cache; and transmitting an active session request to the login session cache, the active session request including the user identifier and the test environment identifier as request parameters. In some embodiments, the network address comprises a uniform resource locator (URL) of the login session cache. In some embodiments, the active session request comprises an HTTP GET request using the URL of the login session cache with the user identifier and the test environment identifier embedded in the URL.

In some embodiments, the session data corresponding to the active session comprises one or more HTTP cookies. In some embodiments, the session data further comprises one or more account numbers associated with the user identifier. In some embodiments, the active session expires after a predetermined amount of time. In some embodiments, when the active session expires, the login session cache removes the session data associated with the active session from the login session cache. In some embodiments, the server computing device periodically refreshes an activity timeout credential associated with the active session to prevent expiration of the active session. In some embodiments, when the activity timeout credential is refreshed, the server computing device transmits a message to the login session cache to prevent removal of the session data associated with the active session from the login session cache.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION

Figure 1:
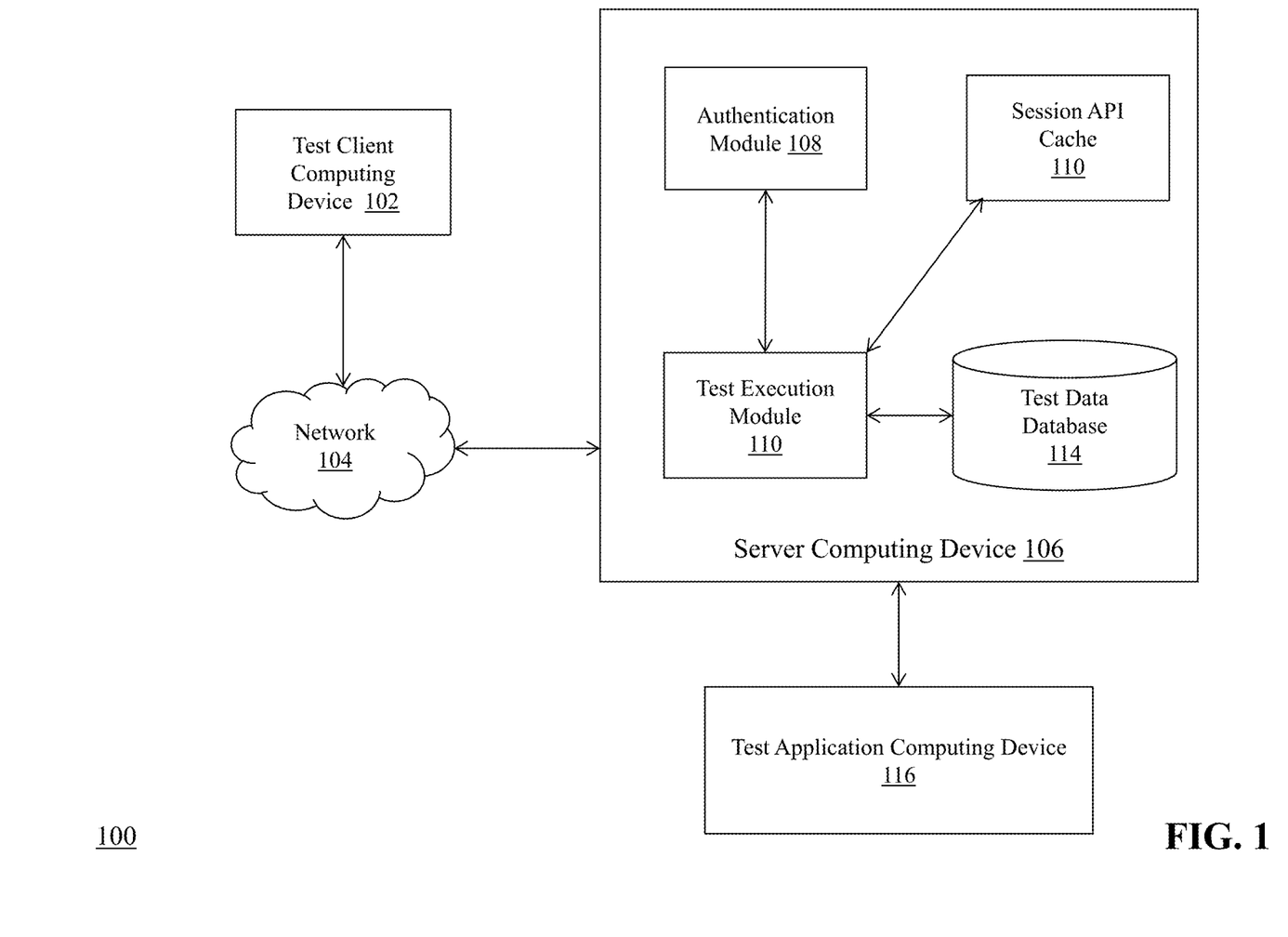
FIG. 1 is a block diagram of a system for caching login sessions to access a software testing environment.

FIG. 1 is a block diagram of a system 100 for caching login sessions to access a software testing environment. The system 100 includes a test client computing device 102, a communications network 104, a server computing device 106 that includes an authentication module 108, a test execution module 110, a session application programming interface (API) cache 112 (also called a login session cache), and a test data database 114, and a test application computing device 116.

The test client computing device 102 connect to one or more communications networks (e.g., network 104) in order to communicate with the server computing device 106 to provide input and receive output relating to executing test cases against software functionality provided by the test application computing device 116, as described herein.

Exemplary test client computing devices 102 include but are not limited to desktop computers, laptop computers, tablets, mobile devices, smartphones, web application servers, cloud-based computing systems, database management platforms, software-as-a-service (SaaS) platforms, sysadmin control devices, and the like. It should be appreciated that other types of computing devices that are capable of connecting to the components of the system 100 can be used without departing from the scope of invention. Although FIG. 1 depicts a single test client computing device 102, it should be appreciated that the system 100 can include any number of test client computing devices.

The communications network 104 enables the test client computing device 102 to communicate with the server computing device 106. The network 104 is typically a wide area network (WAN), such as the Internet and/or a cellular network. In some embodiments, the network 104 is comprised of several discrete networks and/or sub-networks (e.g., cellular to Internet).

The server computing device 106 is a device including specialized hardware and/or software modules that execute on a processor and interact with memory modules of the server computing device 106, to receive data from other components of the system 100, transmit data to other components of the system 100, and perform functions for caching login sessions to access a software testing environment as described herein. The server computing device 106 includes an authentication module 108, a text execution module 110, and a session API cache 112 that execute on the processor of the server computing device 106. The server computing device 106 also includes a test data database 114. In some embodiments, the session API cache 112 is on a separate computing device from the test data database 114 and in other embodiments, both the session API cache 112 and the test data database 114 are located on one or more computing devices that are separate from the server computing device 106 and coupled to the server computing device 106. In some embodiments, the modules 108, 110 and cache 112 are specialized sets of computer software instructions programmed onto one or more dedicated processors in the server computing device.

Although the modules 108, 110, and cache 112 are shown in FIG. 1 as executing within the same server computing device 106, in some embodiments the functionality of the modules 108, 110 can be distributed among one or a plurality of other computing devices that are coupled to the server computing device 106. As shown in FIG. 1, the server computing device 106 enables the modules 108, 110, the session API cache 112, and the test data database 114 to communicate with each other in order to exchange data for the purpose of performing the described functions. It should be appreciated that any number of computing devices, arranged in a variety of architectures, resources, and configurations (e.g., cluster computing, virtual computing, cloud computing) can be used without departing from the scope of the invention. The functionality of the modules 108, 110 and cache 112 will be described in greater detail throughout this specification.

The session API cache 112 and the test data database 114 are computing modules (or in some embodiments, computing devices) that are configured to receive, generate, and store specific segments of data relating to the process of caching login sessions to access a software testing environment as described herein. In some embodiments, all or a portion of the session API cache 112 and/or the test data database 114 can be integrated with the server computing device 106 or be located on a separate computing device or devices. The session API cache 112 and/or the test data database 114 can comprise one or more databases configured to store portions of data used by the other components of the system 100, as will be described in greater detail below.

The session API cache 112 generally stores session data corresponding to one or more valid login sessions to access software functionality provided by the test application computing device 116. In some embodiments, the session data can comprise HTTP cookies for a valid session along with relevant session details such as user ID, account number, account type and other elements that can be used to execute one or more test cases against the software application(s) on the test application computing device 116. It should be appreciated that other types of session data and/or metadata can be stored in the session API cache 112.

The test data database 114 generally stores data corresponding to one or more test cases for execution against software functionality provided by the test application computing device 116. In some embodiments, the data stored in the test data database 114 can comprise test case configuration data (e.g., data used to set conditions and variables used to initialize a test case), test case execution data (e.g., data used to set parameters for the test case to use in executing the software functionality of the test application computing device 116), and the like. It should be appreciated that other types of test data and/or test metadata can be stored in the test data database 114.

The test application computing device 116 is a computing device that provides one or more software applications under test for the purpose of testing the software applications by executing one or more test cases against the software applications. It should be appreciated that in some embodiments, the functionality of the test application computing device 116 can be located on the server computing device 106 or on a separate computing device (as shown in FIG. 1).

Finally, it should be appreciated that the system 100 of FIG. 1 is an exemplary embodiment and that other configurations of the hardware and software modules described therein can be envisioned within the scope of invention. In an alternative embodiment, the test client computing device 102 and the server computing device 106 can comprise a single computing device having the authentication module 108, the test execution module 110, the session API cache 112, and the test data database 114 located thereon, and the single computing device can communicate with the test application computing device 116 for execution of one or more test cases. In another alternative embodiment, the test client computing device 102 can comprise the text execution module 108 and the test data database 114, the server computing device 106 can comprise the authentication module 108 and the session API cache 112, for communicating with the test application computing device 116 for execution of one or more test cases.

An exemplary software application under test can be a web-based application that is accessed by the test client computing device 102 via a browser (e.g., Chrome™, Safari™, or other similar web browsers), although other types of software applications under test can be contemplated within the scope of invention. In one example, the test application computing device 116 can connect to the test client computing device 102 via an HTTP session in a browser to receive commands for the execution of particular test scripts and to provide application data and test results in response to the requests. However, in order to connect to the test application computing device 116 and access the software functionality to be tested, the test client computing device 102 must typically authenticate to the test application computing device 116—which can add substantial time to the execution of test cases, particularly when a new application or browser window has to be opened each time particular functionality is tested (meaning that the test client computing device 102 must re-authenticate each time).

For example, in one embodiment, a user at test client computing device 102 issues a command to test application computing device 116 (e.g., an HTTP GET request) in order to establish a communication session with the test application computing device 116 so that the client device 102 can utilize the test execution module 110 to execute test cases against, e.g., one or more software applications being tested. The test client computing device 102, test execution module 110, and test application computing device 116 then coordinate the execution of the test scripts to activate functionality of the software applications under test and capture corresponding outcomes and resulting files from execution of the test scripts (e.g., logs, image screenshots of the application UI, message notifications, etc.). Exemplary test script automation tools that can be used by the test client computing device 102 and test execution module 110 to execute test cases against the test application computing device 116 are Sahi™, Selenium™, or other similar types of test automation suites.

For each HTTP GET request, the test client computing device 102 has to authenticate to the test application computing device 116 (e.g., via the authentication module 108 of server computing device). In order to avoid the aforementioned authentication delay during large-scale software testing, the test client computing device 102 can take advantage of cached login sessions using the session API cache 112 as described herein to seamlessly execute the test cases without requiring repeated authentication to the test application computing device 116.

Figure 2:
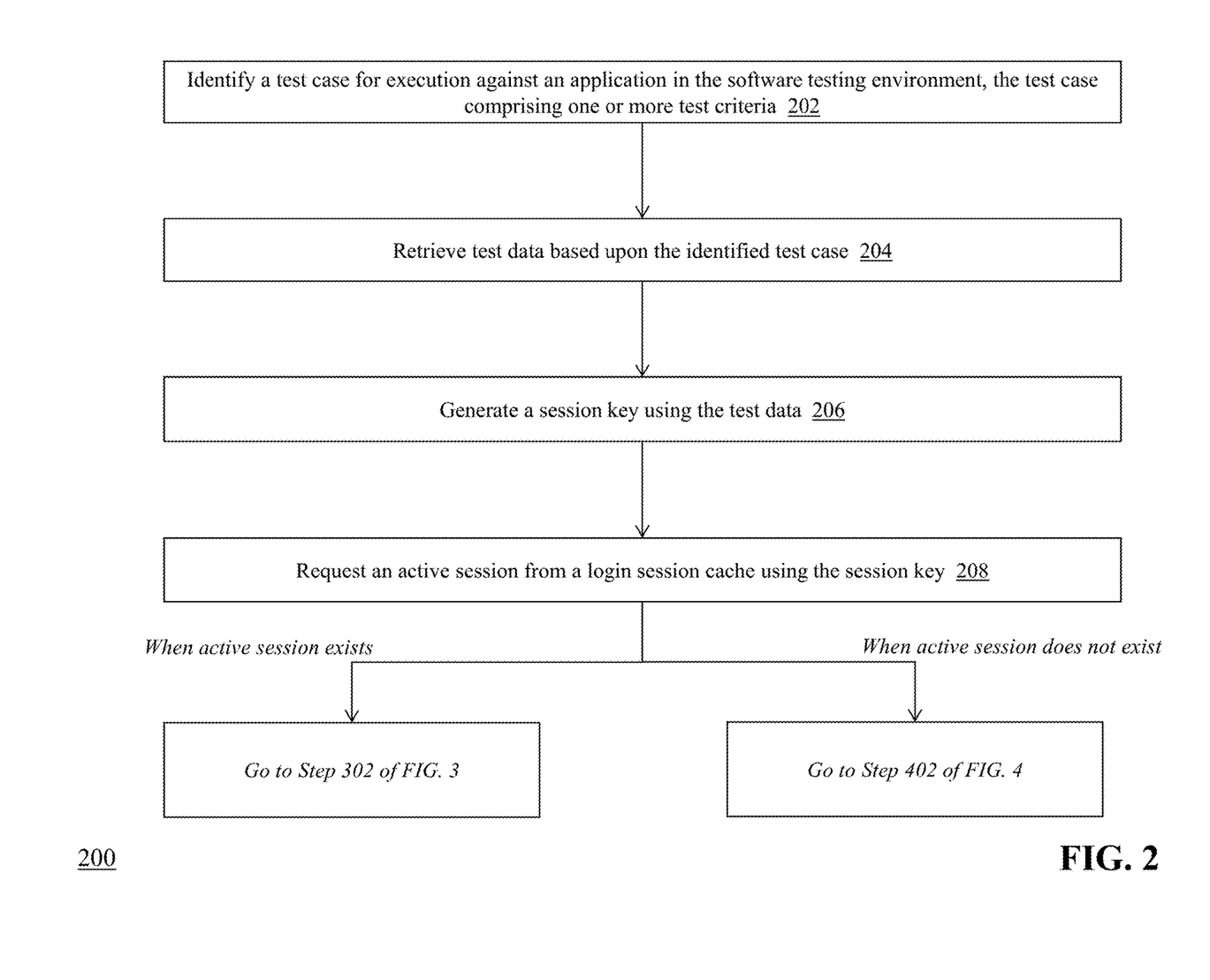
FIG. 2 is a flow diagram of a computerized method of caching login sessions to access a software testing environment.

FIG. 2 is a flow diagram of a computerized method 200 of caching login sessions to access a software testing environment, using the system 100 of FIG. 1. The test execution module 110 of the server computing device 104 identifies (202) a test case for execution against an application in the software testing environment (e.g., as provided by the test application computing device 116). In some embodiments, the test execution module 110 identifies the test case and determines test criteria after receiving instructions from the test client computing device 102 on which test case(s) will be executed. In some embodiments, the test execution module 110 can determine one or more test criteria by accessing and/or importing a resource file that defines the test criteria and is used to create the test case workflow. For example, the resource file can be generated in Robot Framework (robotframework.org), an open source automation framework. The resource file can define keywords for the test workflow steps, variables for configuring the test case, and parameters for which test data can be inserted.

Figure 5:
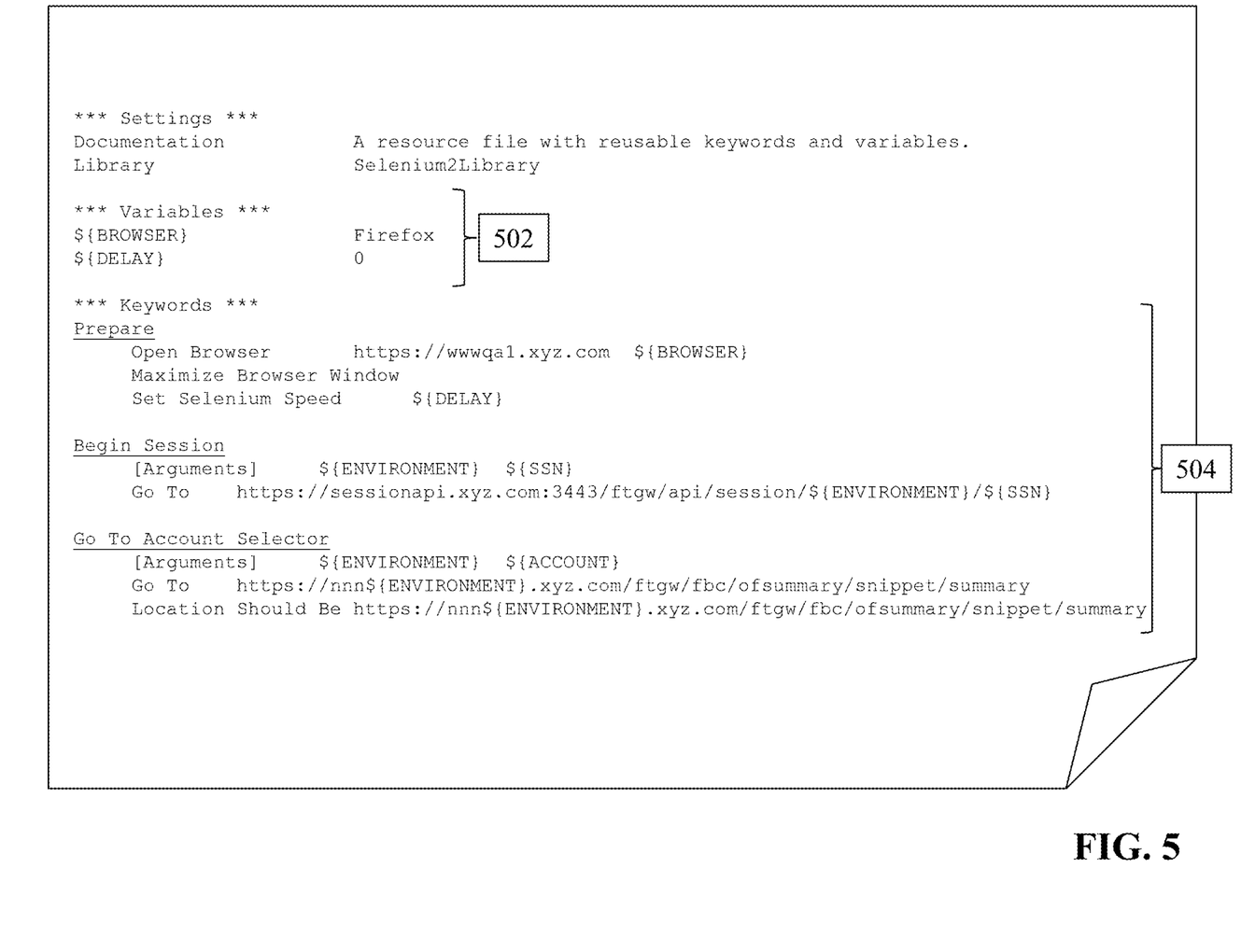
FIG. 5 is an exemplary resource file used to execute test cases.

An exemplary resource file is shown in FIG. 5. The resource file is generated in Robot Framework for use with Selenium2Library (robotframework.org/Selenium2Library/Selenium2Library.html). This resource file relates to a test case for verifying that certain account selector functionality of a software application provided by the test application computing device 116 works correctly, by confirming that the account selector function contains an account that the test user owns. As shown in FIG. 5, the resource file includes one or more variables 502 (e.g., ${BROWSER} to denote the browser to be used in testing, ${DELAY} to specify the Selenium speed), and keywords 504 for generating the test workflow. For example, the keywords 504 are distributed into three sections: Prepare, Begin Session, and Go To Account Selector. The Prepare keywords provide for workflow steps to launch and initialize the browser window and test suite. The Begin Session keywords comprise the HTTPS GET request to the session API module 108 (e.g., via the domain "sessionapi.xyz.com") for retrieval of an active login session, and the Go To Account Selector keywords comprise the HTTPS GET request to the test application computing device 116 (e.g., via the domain "nnn${ENVIRONMENT}.xyz.com", where the ${ENVIRONMENT} argument is retrieved from the test data database 114 as described below) for execution of the test case.

Turning back to FIG. 2, the test execution module 110 can transmit the test criteria and/or a test case indicator to the test data database 114 for retrieval of test data (e.g., parameters to be used in execution of test cases) associated with the test criteria and/or test case indicator. In one example, the test execution module 110 can connect to the test data database 114 and retrieve one or more test parameters associated with the account selector functionality described above. In this example, the test case indicator can be an ID value (e.g., AccountSelector) that maps to one or more test parameters for the account selector function. The test data database 114 can transmit the test parameters to the test execution module 110 (and/or the test client computing device 102) in order for the module 110 to request an active session for the test client computing device 102 to connect to the test application computing device 116 and begin execution of the test cases.

Figure 6:
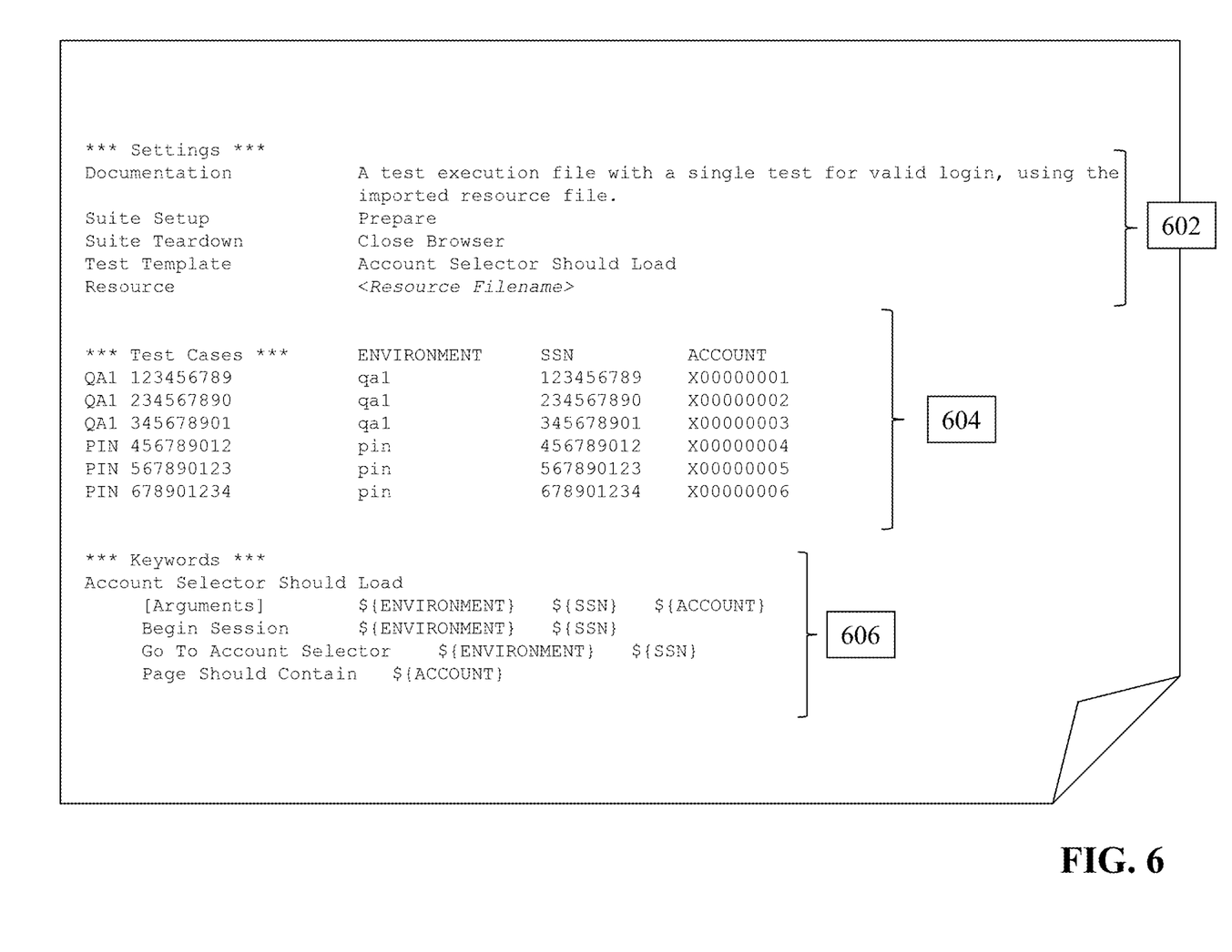
FIG. 6 is an exemplary test execution file used to execute test cases.

The test execution module 110 also generates text execution files to carry out the application testing procedure. FIG. 6 is an exemplary test execution file generated by the test execution module 110. As shown in FIG. 6, the test execution file includes settings 602 for initialization of the test execution, test case data 604 to be used in executing one or more test cases against the test application computing device 116, and keywords 606 which include the workflow steps for executing the specific test cases. The settings 602 include setup and teardown steps for the test execution process, identification of a test template (i.e., Account Selector Should Load), and the filename for a resource file to be used in executing the tests (see FIG. 5). As can be appreciated, the setup setting refers to the Prepare keywords in the resource file of FIG. 5, and the test execution module 110 can execute those keywords (i.e., open a browser to a default URL, maximize the browser window, and set the Selenium speed) when the Suite Setup process is called in the test execution file.

The test case data 604 comprises a plurality of test cases and associated arguments that will be executed against the test application computing device 116. As shown in FIG. 6, each test case has an identifier (e.g., "QA1 123456789") that specifies the particular test case and a plurality of associated arguments (e.g., ENVIRONMENT='qa1', SSN='123456789', ACCOUNT='X00000001') that will be applied during execution of the test case. The keywords 606 comprise the test workflow steps—i.e., 1) loading the arguments ${ENVIRONMENT}, ${SSN}, ${ACCOUNT} from a first test case, 2) performing the Begin Session steps as referenced in the resource file of FIG. 5, 3) performing the Go To Account Selector steps as referenced in the resource file of FIG. 5, and 4) analyzing the results from step 3 to confirm that the loaded page contains the expected ${ACCOUNT} argument.

Turning back to FIG. 2, once the test execution module 110 has received the test data from the test data database 114 as described above, the test execution module 110 generates (206) a session key (or a plurality of session keys) using the test data. In some embodiments, each session key (also called a cache key) is comprised of a login user ID (e.g., SSN in the Test Cases section 604 of FIG. 6) and a test environment identifier (e.g., ENVIRONMENT in the Test Cases section 604 of FIG. 6). For example, the test execution module 110 can parse the test data to extract the relevant data elements that make up the session key for each test case. In some embodiments, different test cases can utilize the same session key and/or session key data elements. In other embodiments, each test case utilizes its own, separate session key.

Using the generated session key, the test execution module 110 requests (308) an active login session from a login session cache (e.g., the session API cache 112). In some embodiments, the text execution module 110 generates an HTTP GET or HTTPS GET request to a logical address or a network address associated with the session API cache 112, with the session key embedded in the request. For example, as shown in FIG. 5, the Begin Session keywords include the following command:

Go To https://sessionapi.xyz.com:3443/ftgw/api/session/${ENVIRONMENT}/${SSN} where "sessionapi.xyz.com" comprises the network address of the session API cache 112, and the session key comprised of ${ENVIRONMENT} and ${SSN} is embedded in-line as part of the URL. Substituting the above parameter names for example values taken from the first test case in FIG. 6, the test execution module 110 calls the following URL:

https://sessionapi.xyz.com:3443/ftgw/api/session/qa1/123456789

The session API cache 112 receives the request from the test execution module 110 and determines whether an active session exists for the session key provided in the request. For example, one or more active login sessions can be established for the test application computing device 116 (e.g., using different user names or authentication parameters) when the system 100 is first initialized, and the corresponding session key and session data (e.g., HTTP cookies, session metadata, account numbers, account types, etc.) can be stored in the session API cache 112 for subsequent use by the test execution module 110. Then, when the module 110 requests an active session using the session key, the session API cache 112 can look up the associated session data and return the session data to the test execution module 110 for use in establishing a connection between the test client computing device 102 and the test application computing device 116 without requiring the test client computing device 102 to authenticate to the test application computing device 116 (e.g., using the authentication module 108 to generate a new session).

Figure 3:
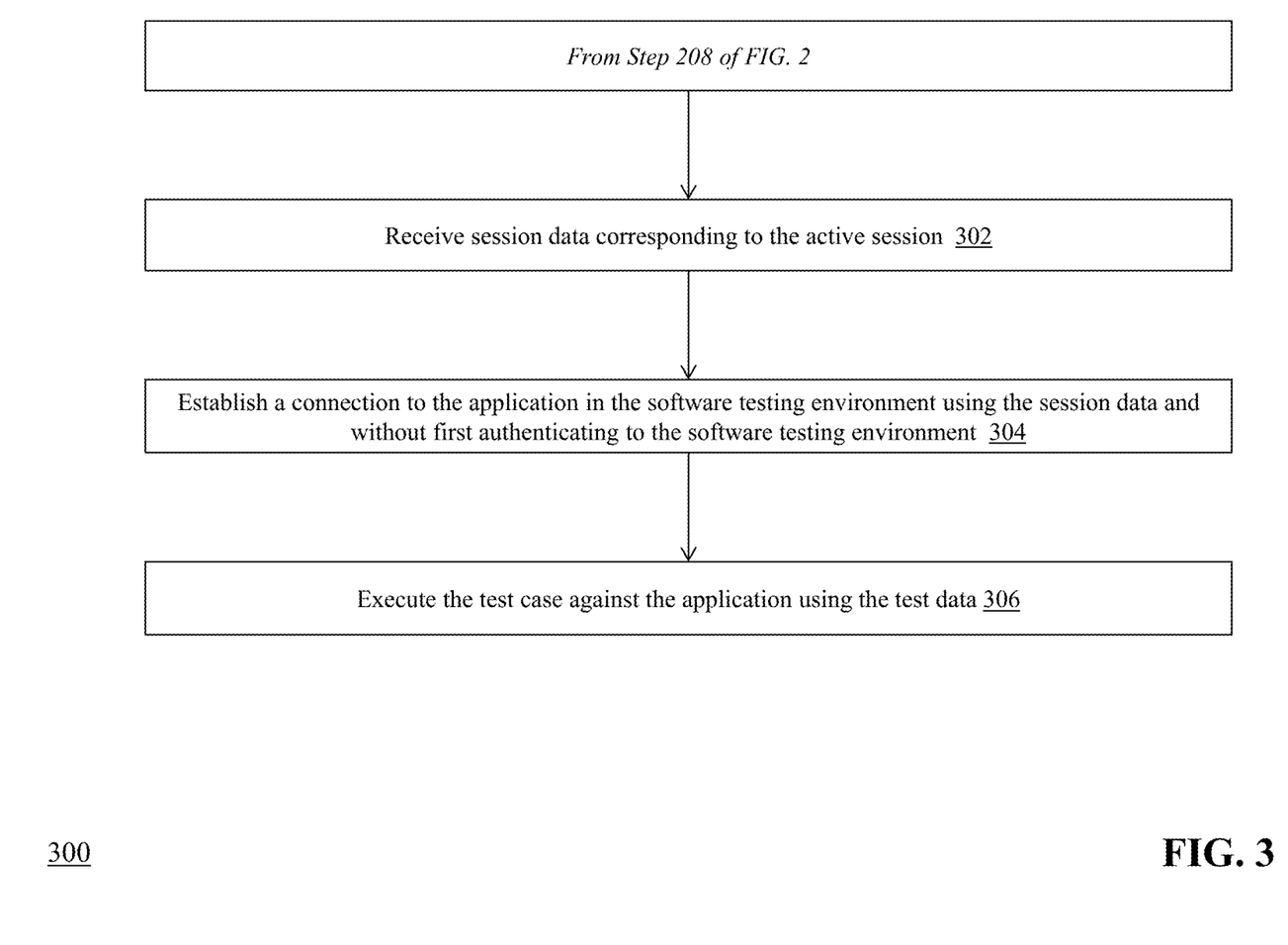
FIG. 3 is a flow diagram of a computerized method of establishing a connection to an application in a software testing environment using cached session data.

When the session API cache 112 determines that an active session exists for the session key, the session API cache 112 returns the corresponding session data to the test execution module 110. FIG. 3 is a flow diagram of a computerized method 300 of establishing a connection to an application in a software testing environment (i.e., an application provided by the test application computing device 116) using cached session data. As shown in FIG. 3, the test execution module 110 receives (302) the session data corresponding to the active session from the session API cache 112. The test execution module 110 then establishes (304) a connection to the application in the software testing environment (as provided by the test application computing device 116) using the session data and without first authenticating to the software testing environment. For example, as shown in FIG. 5, the Go To Account Selector keywords comprise an HTTPS GET call to the following URL:

https://nnn${ENVIRONMENT}.xyz.com/ftgw/fbc/
    ofsummary/snippet/summary where ${ENVIRONMENT} corresponds to the test environment indicator in the corresponding test case (e.g., qa1, pin in FIG. 6). Therefore, the URL called by the test execution module 110 points to the test application computing device 116 that provides the functionality to be tested. By virtue of having the session data (e.g., HTTP cookies) received from the session API cache 112, the test execution module 110 is determined to have an active session by the test application computing device 116 and therefore, the test application computing device 116 does not require the test execution module 110 to go through an authentication process to establish a communication session and instead proceeds to provide the software functionality to be tested. The text execution module 110 then executes (306) the test case against the application provided by the test application computing device 116 using the test data. For example, in view of FIGS. 5 and 6, the test execution module 110 executes the Go To Account Selector keyword to connect a browser on the test client computing device 102 to a URL of the test application computing device 116, load the corresponding page in the browser, and analyze the page (i.e., with the keyword Page Should Contain ${ACCOUNT}) loaded from the test application computing device 116 to determine if the page contains the correct account number from the test data, thus confirming the test was successful.

Figure 4:
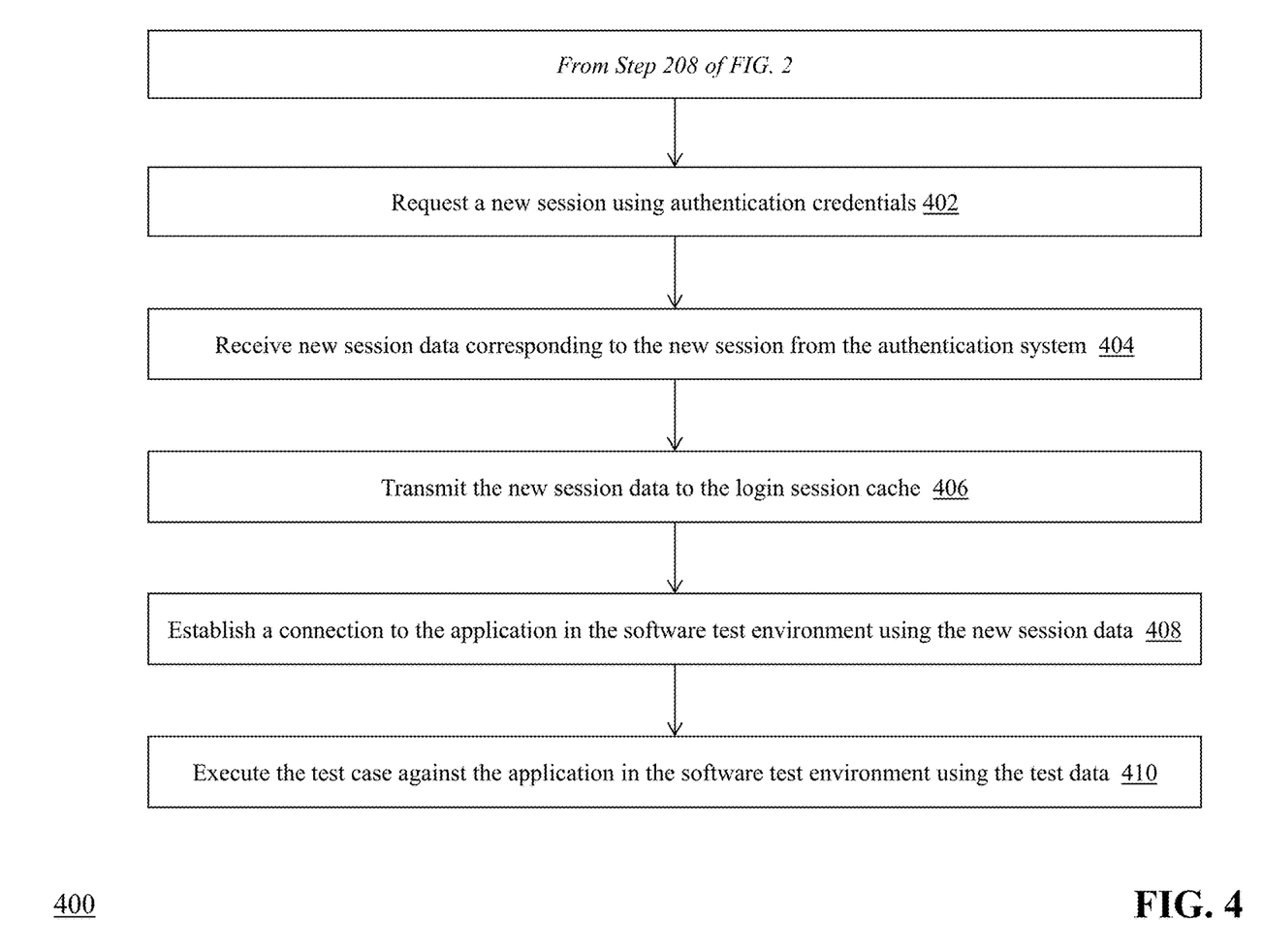
FIG. 4 is a flow diagram of a computerized method of establishing a connection to an application in a software testing environment using newly-generated session data.

In some cases, however, the session API cache 112 does not contain an active session that matches the session key generated by the test execution module 110. In these cases, the test execution module 110 requests a new session using the authentication module 108. FIG. 4 is a flow diagram of a computerized method 400 of establishing a connection to an application in a software testing environment (e.g., provided by the test application computing device 116) using newly-generated session data. As shown in FIG. 4, the test execution module 110 receives a notification from the session API cache 112 that no active session data exists for the session key (also called a cache miss). The test execution module 110 requests (402) a new session from the test application computing device via the authentication module 108 using authentication credentials. In some embodiments, the authentication credentials used by the test execution module 110 are stored in the test data database 114 and retrieved by the module 110 when the new session request is generated. In some embodiments, the authentication credentials are preconfigured as part of the text execution module 110 (e.g., in a configuration file accessible to the module 110). The test execution module 110 transmits the new session request to the authentication module 108, which communicates with the test application computing device 116 to generate a new session (including generating new session data, such as HTTP cookies, for the session) and returns the new session data to the test execution module 110. The module 110 then transmits (406) the new session data to the session API cache 112, so that the cache 112 can store the new session data as an active session in conjunction with one or more elements of test data (e.g., ${ENVIRONMENT}, ${SSN}) that will be used to execute test cases as part of the new session. The test execution module 110 then establishes (408) a connection from the test client computing device 102 to the application in the software testing environment (e.g., provided by the test application computing device 116) using the new session data. Once the new session is established, the test execution module 110 can execute (410) one or more test cases against the application in the software testing environment using the test data (as described previously with respect to FIGS. 3, 5 and 6.

Another important aspect of the present methods and systems is the advantageous feature to keep active sessions alive in the session API cache 112 using a credential refresh function. Each active session can be associated with an activity timeout credential that indicates when the corresponding session expires. For example, the activity timeout credential can have a timestamp (e.g., time the active session started+00:30) or time value (e.g., thirty minutes) that determines when the active session is no longer available for use. Generally, the session API cache 112 can be configured to remove session data associated with one or more active sessions when those active sessions expire by, e.g., evaluating the activity timeout credential and determining if the session is expired.

In some embodiments, the test execution module 110 is configured with a background process that keeps sessions active by periodically refreshing the activity timeout credential associated with one or more of the active sessions to prevent expiration of the active sessions. For example, the test execution module 110 can update the activity timeout credential for an active session to reset the timestamp in the credential so that the session API cache 112 does not remove the session data. This background process is configured to update the activity timeout credential at intervals (e.g., 20 minutes) that are shorter than the preconfigured or default timeout (e.g., 30 minutes). In some embodiments, when the activity timeout credential is refreshed, the test execution module 110 transmits a message to the session API cache 112 to prevent removal of the session data associated with the active session from the login session cache. In this example, the session API cache 112 may maintain its own evaluation of session data to determine whether the active session data should be kept or discarded. As a result, upon refreshing the activity timeout credential, the test execution module 110 can instruct the session API cache 112 to update or reset the expiration value for active session data so that the session data is not removed from the cache 112.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®).

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed is:

1. A system for caching login sessions to access a software testing environment, the system comprising a server computing device having a memory for storing computer-executable instructions and a processor that executes the computer-executable instructions to:
   identify a test case for execution against an application in the software testing environment, the test case comprising one or more test steps;

retrieve test data based upon the identified test case, the test data comprising one or more arguments to be applied during execution of the test case;

generate a session key using the test data, the session key comprising a login user ID and a test environment identifier;

request an active session from a login session cache using the session key, wherein data elements associated with the active session are generated and stored in the login session cache during initialization of the software testing environment;

when an active session exists in the login session cache:
receive, from the login session cache, session data comprising one or more HTTP cookies corresponding to the active session;

establish a connection to the application in the software testing environment using the session data and without first authenticating to the software testing environment; and execute one or more test steps of the test case against the application in the software testing environment including inserting one or more arguments from the test data into corresponding parameters in the test case, loading a webpage, and analyzing the webpage to determine whether the webpage contains an argument from the test data.

2. The system of claim 1, wherein when an active session does not exist in the login session cache, the server computing device:

requests, from an authentication system, a new session using authentication credentials;

receives, from the authentication system, new session data corresponding to the new session;

transmits the new session data to the login session cache;

establishes a connection to the application in the software testing environment using the new session data; and executes one or more test steps of the test case against the application in the software testing environment including inserting one or more arguments from the test data into corresponding parameters in the test case, loading a webpage, and analyzing the webpage to determine whether the webpage contains an argument from the test data.

3. The system of claim 1, wherein requesting an active session from the login session cache using the session key comprises:

identifying a network address associated with the login session cache; and transmitting an active session request to the login session cache, the active session request including the login user ID and the test environment identifier as request parameters.

4. The system of claim 3, wherein the network address comprises a uniform resource locator (URL) of the login session cache.

5. The system of claim 4, wherein the active session request comprises an HTTP GET request using the URL of the login session cache with the login user ID and the test environment identifier embedded in the URL.

6. The system of claim 1, wherein the session data further comprises one or more account numbers associated with the login user ID.

7. The system of claim 1, wherein the active session expires after a predetermined amount of time.

8. The system of claim 7, wherein when the active session expires, the login session cache removes the session data associated with the active session from the login session cache.

9. The system of claim 7, wherein the server computing device periodically refreshes an activity timeout credential associated with the active session to prevent expiration of the active session.

10. The system of claim 9, wherein when the activity timeout credential is refreshed, the server computing device transmits a message to the login session cache to prevent removal of the session data associated with the active session from the login session cache.

11. A computerized method of caching login sessions to access a software testing environment, the method comprising:

identifying, by a server computing device, a test case for execution against an application in the software testing environment, the test case comprising one or more test steps;

retrieving, by the server computing device, test data based upon the identified test case, the test data comprising one or more arguments to be applied during execution of the test case;

generating, by the server computing device, a session key using the test data, the session key comprising a login user ID and a test environment identifier;

requesting, by the server computing device, an active session from a login session cache using the session key, wherein data elements associated with the active session are generated and stored in the login session cache during initialization of the software testing environment;

when an active session exists in the login session cache:
receiving, by the server computing device from the login session cache, session data comprising one or more HTTP cookies corresponding to the active session;

establishing, by the server computing device, a connection to the application in the software testing environment using the session data and without first authenticating to the software testing environment; and executing, by the server computing device, one or more steps of the test case against the application in the software testing environment including inserting one or more arguments from the test data into corresponding parameters in the test case, loading a webpage, and analyzing the webpage to determine whether the webpage contains an argument from the test data.

12. The method of claim 11, when an active session does not exist in the login session cache, the method further comprising:

requesting, by the server computing device from an authentication system, a new session using authentication credentials;

receiving, by the server computing device from the authentication system, new session data corresponding to the new session;

transmitting, by the server computing device, the new session data to the login session cache;

establishing, by the server computing device, a connection to the application in the software testing environment using the new session data; and executing, by the server computing device, one or more steps of the test case against the application in the software testing environment including inserting one or more arguments from the test data into corresponding parameters in the test case, loading a webpage, and analyzing the webpage to determine whether the webpage contains an argument from the test data.

13. The method of claim 11, wherein requesting an active session from the login session cache using the session key comprises:
    identifying, by the server computing device, a network address associated with the login session cache; and
    transmitting, by the server computing device, an active session request to the login session cache, the active session request including the login user ID and the test environment identifier as request parameters.

14. The method of claim 13, wherein the network address comprises a uniform resource locator (URL) of the login session cache.

15. The method of claim 14, wherein the active session request comprises an HTTP GET request using the URL of the login session cache with the login user ID and the test environment identifier embedded in the URL.

16. The method of claim 11, wherein the session data further comprises one or more account numbers associated with the login user ID.

17. The method of claim 11, wherein the active session expires after a predetermined amount of time.

18. The method of claim 17, wherein when the active session expires, the login session cache removes the session data associated with the active session from the login session cache.

19. The method of claim 17, wherein the server computing device periodically refreshes an activity timeout credential associated with the active session to prevent expiration of the active session.

20. The method of claim 19, wherein when the activity timeout credential is refreshed, the server computing device transmits a message to the login session cache to prevent removal of the session data associated with the active session from the login session cache.

* * * * *